United States Patent [19]

Marschner

[11] Patent Number: 4,958,434

[45] Date of Patent: Sep. 25, 1990

[54] HOLDING DEVICE AND SHEARING DEVICE USED IN CONCERT FOR HAND HELD SHEARING OF THIN-WALL TUBES

[76] Inventor: Charles F. Marschner, 414 The Circle, Longwood, Fla. 32779

[21] Appl. No.: 455,281

[22] Filed: Dec. 22, 1989

[51] Int. Cl.$^5$ .............................................. A24C 5/12
[52] U.S. Cl. ...................................... 30/101; 30/102; 279/1 S
[58] Field of Search ................... 30/90.3, 93, 96, 101, 30/102; 83/54; 279/1 S

[56] References Cited

U.S. PATENT DOCUMENTS

| | | |
|---|---|---|
| 1,618,585 | 2/1927 | Feister . |
| 1,632,004 | 6/1927 | Hampton . |
| 1,756,773 | 4/1930 | Wendt . |
| 2,359,594 | 10/1944 | Turenchalk . |
| 2,409,590 | 10/1946 | Russell . |
| 2,491,605 | 12/1949 | Chittenden . |
| 2,513,139 | 6/1950 | Burness et al. . |
| 2,780,469 | 2/1957 | Hull . |
| 2,821,781 | 2/1958 | Zeiler . |
| 2,871,739 | 2/1959 | Granzow . |
| 3,315,355 | 4/1967 | Osburn et al. . |
| 3,677,560 | 7/1972 | Clarkson . |
| 3,803,895 | 4/1974 | King, Jr. . |
| 3,910,479 | 10/1975 | Kohler ................................. 278/20 |
| 3,988,827 | 11/1976 | Sakamoto et al. ....................... 30/92 |
| 4,347,634 | 9/1982 | Sawan ................................... 7/157 |
| 4,510,830 | 4/1985 | Post ...................................... 83/54 |
| 4,594,029 | 6/1986 | Michael, III ........................ 408/1 R |

Primary Examiner—Douglas D. Watts
Attorney, Agent, or Firm—Julian C. Renfro

[57] ABSTRACT

Hand operable apparatus for shearing thin-wall sleeve members to a precise, selected length without causing sidewall collapse, this apparatus comprising an elongate, generally cylindrical body having a partially hollow interior. An elongate support mandrel is mounted in a cantilever manner on the longitudinal centerline within the cylindrical body, with one end of the mandrel being supported adjacent one end of the generally cylindrical body. The other end of the mandrel is free and of a diameter such that the end of a thin-walled sleeve member to be cut to length can be closely received thereon. A cutoff device is operatively mounted on the generally cylindrical body adjacent the free end of the mandrel, which cutoff device can be brought forcefully into contact with the sleeve member at a selected location. The user can then accomplish shearing of the sleeve member by causing relative rotation between the cylindrical body and the sleeve member. The sleeve member can be supported by a holder adapted to be brought into carefully aligned contact with the mandrel before the shearing procedure begins.

25 Claims, 5 Drawing Sheets

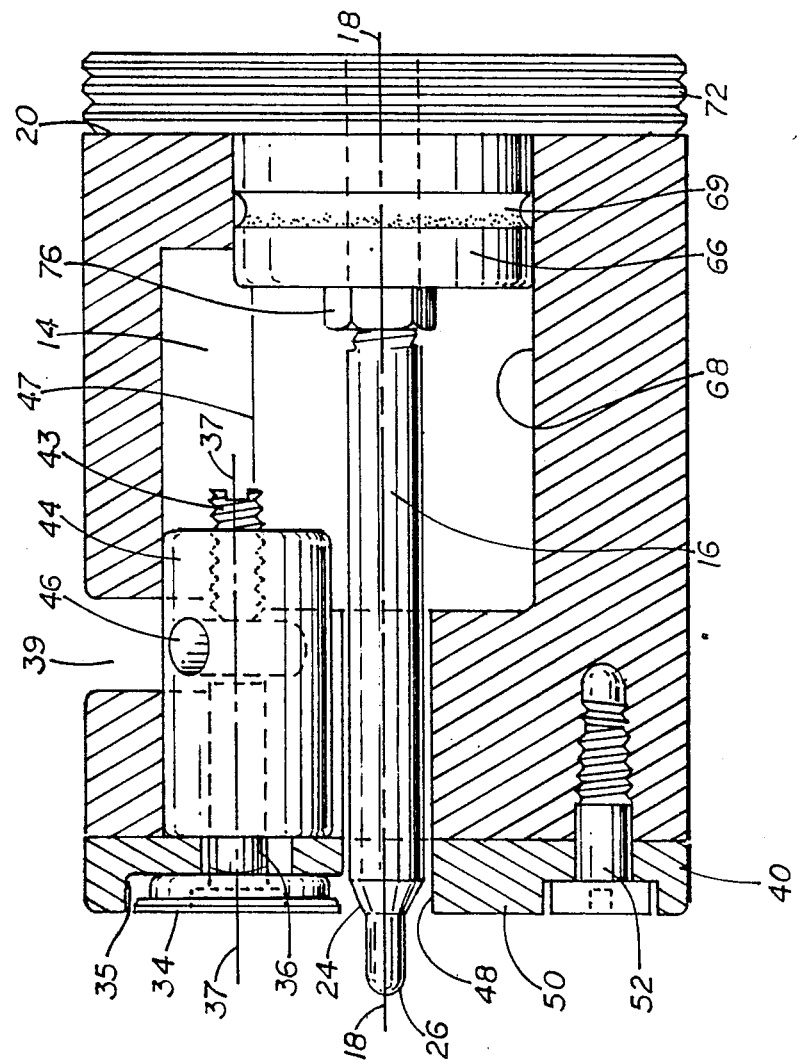
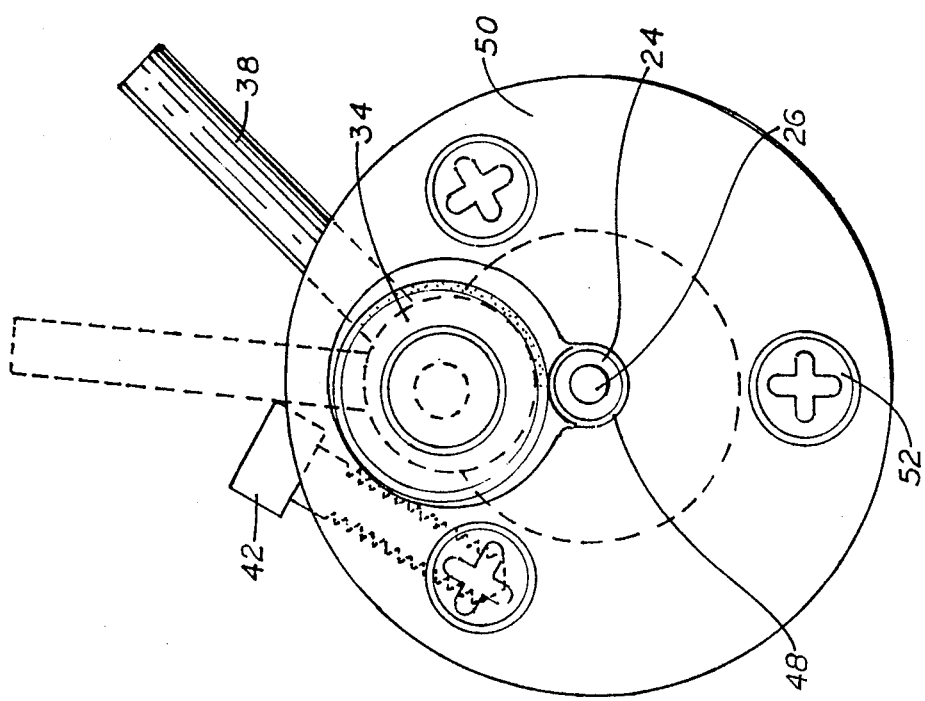
FIG 2
FIG 3

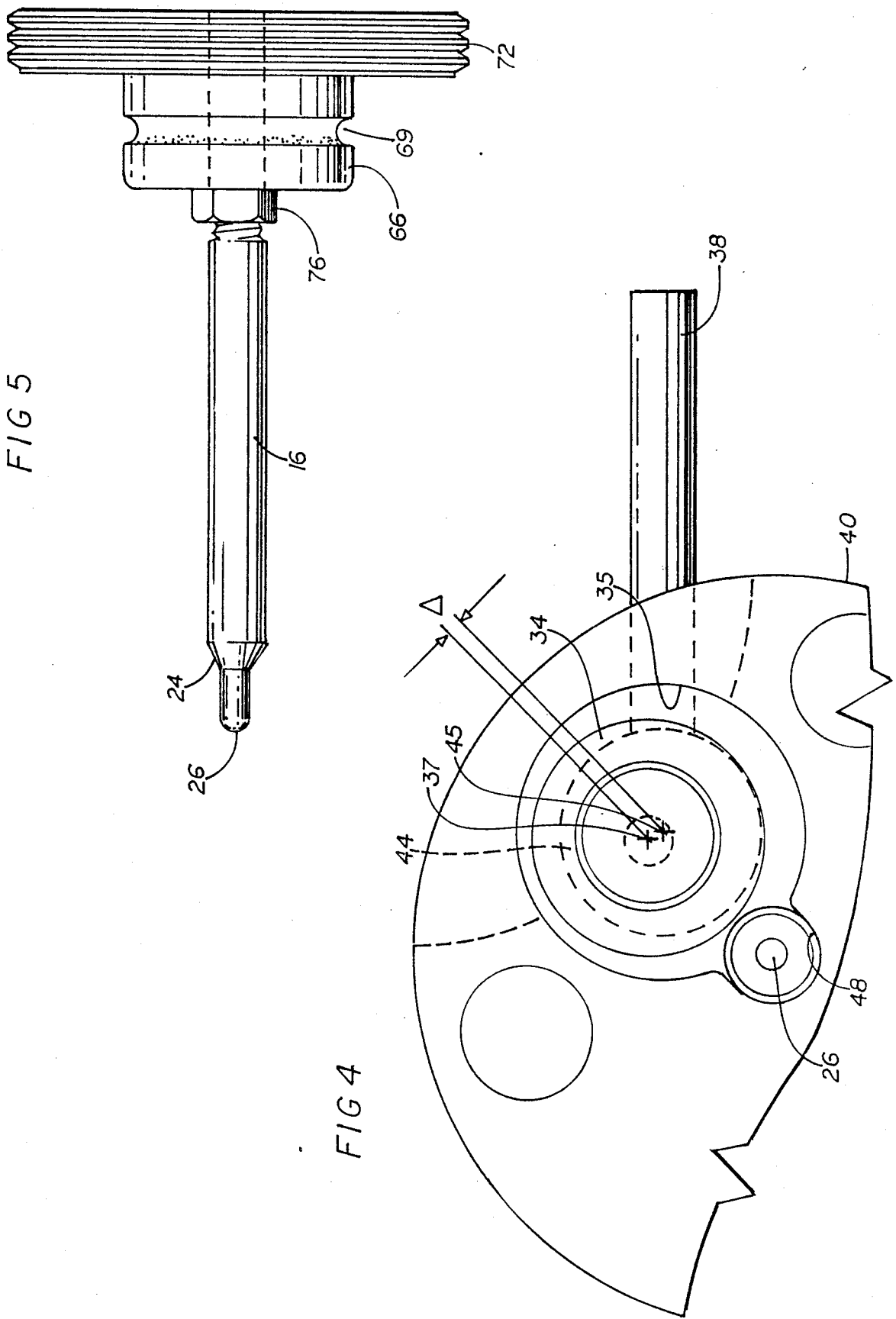

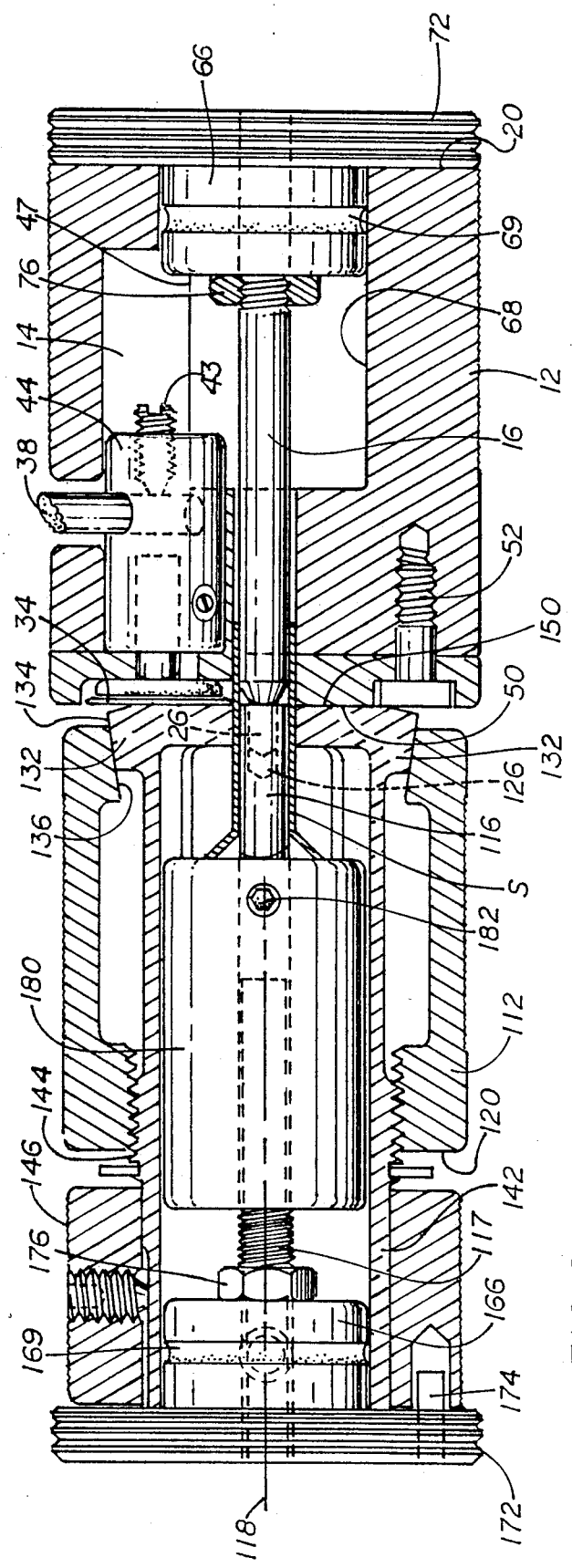
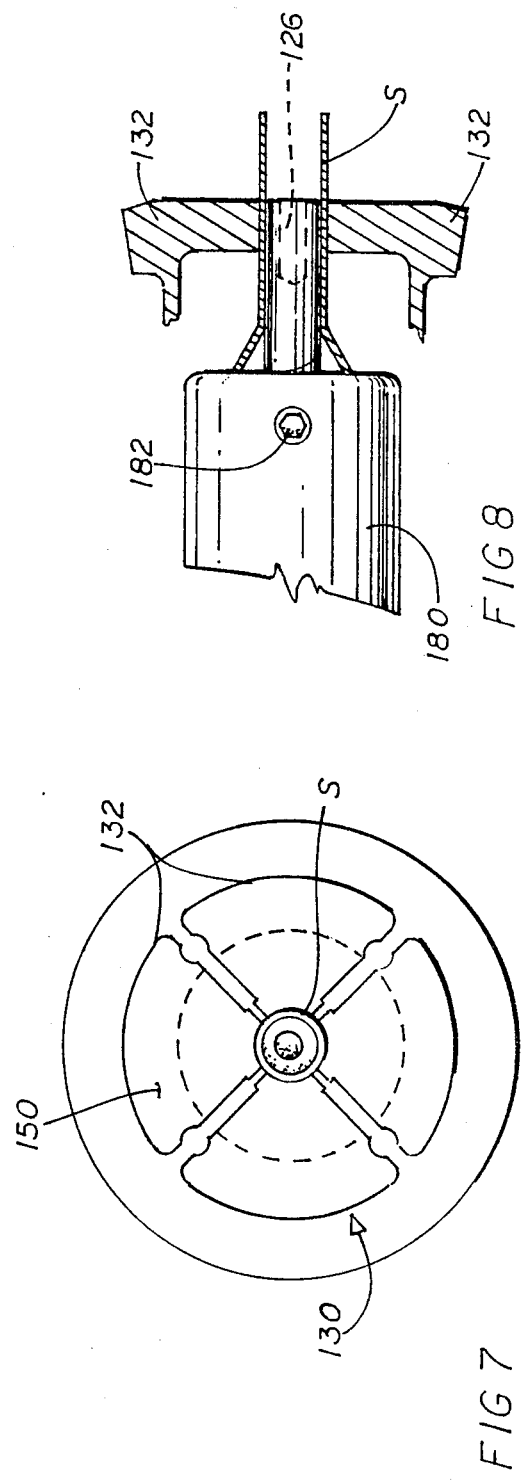
FIG 6
FIG 7
FIG 8

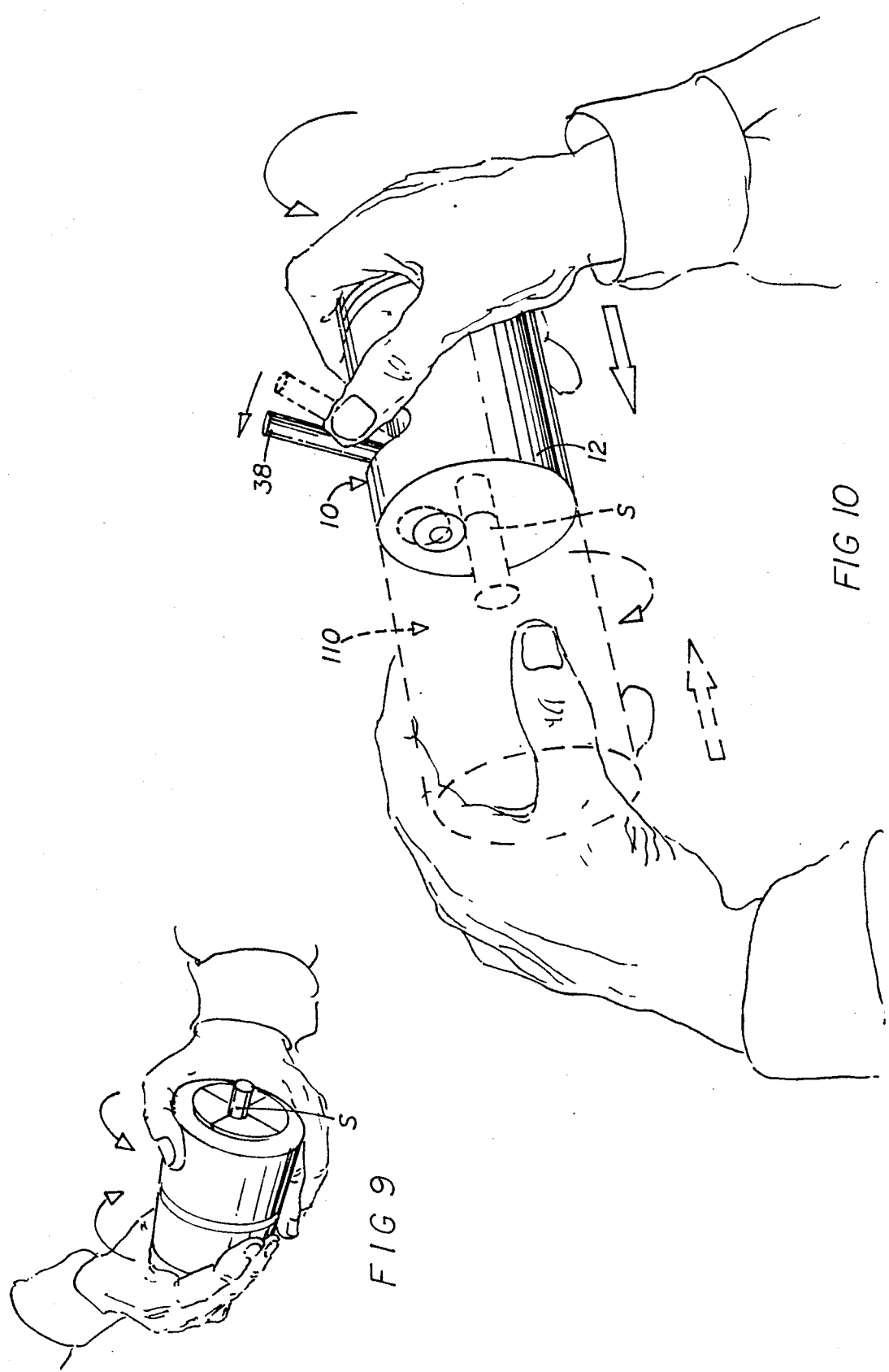

HOLDING DEVICE AND SHEARING DEVICE USED IN CONCERT FOR HAND HELD SHEARING OF THIN-WALL TUBES

Background of the Invention

Experience shows that thin- wall tubular sections, especially when made from a high strength, tough material, are very difficult to reduce in length by any cutting means. The tube material tends to snag and tear and results in a rough objectionable, cut surface. Products such as thin-wall bushings, known as sleeves and used in aerospace and other industries to either moderately enlarge existing bolt diameters or protectively bush holes in metal and composite structure, are especially difficult to adjust from a long length to a shorter length for adapting to work material thickness.

Tubular products used as sleeves or as spacers frequently must be reduced to length in the field to permit adaptation to a particular repair, modification or maintenance situation. At other times the problem is encountered during original manufacture. In any case, while the tubular bushings or spacers are available, the means for reducing them to a precise length are generally not available. This is because the necessary lathes, grinders, power tools or the power to operate them are usually remote from the job.

In the case of bushings known as sleeves the problem of adjusting to length was solved in part by machine grooving the tubular sections peripherally and at specific intervals along their length to a depth of about ½ the wall thickness. In order to reduce length to fit the job at hand, the grooved tubular sections were inserted into a device known as a "step plate" whose thickness steps coincided with a groove position on the previously grooved tube. The step plate supports the outside diameter of the tube. A break-off handle, which fits into and over the tube portion which is to be discarded, is then used to break the tube at the desired groove.

Experience with step plates has shown that clearance between the tubular elements outside diameter and the receiving holes in the step plate should be as small as possible, preferably close to a metal-to-metal fit. Also internal support of the tube portion within the step plate holes would be desirable. Both of these characteristics would enable cleaner and more consistent tube break-off. Since the break-off handle must be in contact, internally and externally for a tube length of about one diameter, the suitable tube length after break-off is restricted.

Some users of sleeves and thin-wall tubular elements do not wish to accept grooved parts. Since this precludes the adjustment of length by use of step plates and break-off handles, the user must either buy pre-cut parts or cut standard length parts to length near the worksite. As pointed out previously, this is somewhat difficult and requires the use of relatively large powered equipment such as lathes, grinders, power tools, etc.

Throughout a period of over 10 years many concepts were considered and tested to enable the user of thin-wall tubular products to conveniently reduce longer parts to shorter parts to fit the job at hand. These concepts included special plier sets to hold and cut or shear tubular parts; standard and specially adapted tube cutters; finger ring cutter adaptations; "decks" or "stacks" of hardened 1/16' thick plates to support the tubes at different length increments; adapting of key cutters to power trim tubular sections to length; canine toe nail clippers, precision adapted to tube outside diameters; wobble devices, both internal and external; etc. These concepts and others failed to satisfy the requirement for properly gripping thin-wall tubular parts so that they could be broken-off at existing grooves or be cut, sheared or ground to length. Laser cutting and high pressure fluid cutting were also considered and discarded as costly, dangerous and difficult to apply.

After exploring many concepts and actually trying a substantial number of approaches, I determined that some means of shearing the thin-wall, high strength tubular elements peripherally should achieve a high quality finish or cut on the portion of the tube to be retained. Here again several alternatives were available such as straight shear surfaces, pronged shearing devices and a rolling, progressive shear. whatever the means used had to be one which would enable a person of modest strength to perform the shearing operation without power assist.

The problem of firmly holding the thin-wall tubular workpieces had been solved separately. This was critical to the development of a truly satisfactory hand operated shear-off device.

As will shortly be explained, a principal object of this invention is to provide a hand held device for securely clamping tubular elements so that in the field they can be circumferentially sheared at a precise location by the use of an accompanying hand held shear-off device, without having to risk distortion or crushing of the tubing, or creating burrs or irregularities thereon.

SUMMARY OF THE INVENTION

This invention involves hand operable apparatus for shearing thin-wall sleeve members to a precise, selected length without causing sidewall collapse or the creation of burrs. This apparatus comprises an elongate, generally cylindrical body having a partially hollow interior, with an elongate support mandrel mounted in a cantilever manner on the longitudinal centerline, within the cylindrical body.

One end of the support mandrel is supported adjacent one end of the generally cylindrical body, whereas the other end of the support mandrel is free and of a diameter such that the thin-walled sleeve member to be cut to length can be closely received thereon. Cutoff means in the form of a shearing member are operatively mounted for radial movement by support means on the generally cylindrical body adjacent the free end of the support mandrel, and a lever is conveniently provided so that the operator or user can bring the cutoff means forcefully into contact with the sleeve member at a carefully selected location on the sleeve member.

The cutoff means serves to incrementally shear the sleeve member as a result of relative rotative motion between the cutoff means and the sleeve member. As will be seen in greater detail hereinafter, the sleeve member representing the workpiece is supported by a separate hand held device, and the cutoff means is circular and rotatably supported so as to roll around the exterior of the sleeve member, to progressively shear same.

The elongate cylindrical body containing the cutoff means is to be noted to have a circular face plate representing an outwardly disposed contact surface, and to have a centrally disposed hole in such outwardly disposed surface, located on the longitudinal centerline of the cylindrical body. It is into this hole that a thin-wall sleeve member to be cut to length can be inserted.

The cutoff means or shearing member has a sharpened circumferential edge, operatively mounted in the plane of the faceplate and is movable between operational and non-operational positions. The shearing member is selectively movable on occasion toward the sleeve member, to selectively force the sharpened circumferential edge through the sidewall of the sleeve member, thus to shear the sleeve member along the plane of the face plate. It is to be noted that the sleeve member is progressively sheared by causing relative rotative motion between the shearing member and the sleeve member.

As will be understood from subsequent description, the elongate support mandrel is constructed so as to be readily removable from the elongate cylindrical body, and a novel interconnect means is utilized for maintaining coaxial alignment between the sleeve member and the shearing member.

It is to be realized that a separate hand held device of generally cylindrical configuration is normally used for supporting the tubular workpiece to be cut to length, with latter device having a partially hollow interior and means for supporting in a fixed relationship therein, the thin-wall sleeve member to be cut to length. A support pin is supported in a cantilever manner symmetrically along the centerline of the interior of the hand held device, with the support pin having a free end and being adapted to receive the thin-wall sleeve member thereon. A plurality of radially movable collet elements are mounted on the device adjacent the free end of the support pin, with the radially inner portion of each of the collet elements being arranged to move radially inward so as to forcefully contact, on occasion, the exterior of the thin-wall sleeve member, to prevent undesired rotation thereof.

The collet elements, upon being caused to move radially inward, serve to tightly and non-rotatably clamp the thin-wall sleeve member in contact with the centrally disposed pin, and means on the free end of the support pin enable the user to bring the thin-wall sleeve member clamped by the collet elements into carefully aligned contact with the mandrel and the shearing member of the accompanying hand operable apparatus. It is by causing relative rotation between the cutoff device and the sleeve holding device that sleeve cutoff at the desired location is brought about.

It is to be noted that the support means for operatively mounting the cutoff disc supports the disc in a flat recess such that it resides in the plane of the circular face plate. The support means permits the cutoff disc to be moved from one position to another in the flat recess. It is thus to be understood that the cutoff disc and its sharpened peripheral edge are located approximately in the plane of the contact surface of the circular face plate, and the previously mentioned lever is provided for laterally moving the cutoff disc between active and inactive positions in the flat recess with respect to the longitudinal centerline of the cylindrical body.

As should by now be obvious, the cutoff disc is adapted, when moved by the lever toward its active position, to come into forceful contact with the inserted thin-wall sleeve member, to cause the severing thereof as a consequence of relative rotative motion taking place between the sharpened peripheral edge of the cutoff disc and the sleeve member, due to the relative rotation of the two hand held members.

It is thus to be seen that I have provided a novel apparatus and method, involving a pair of hand held devices to be used in a cooperating relationship, such that even in field conditions, thin-wall tubing members can be cut to a precise length without creating burrs or distorting the configuration of the tubing members.

It is therefore a principal object of this invention to provide a hand held device for securely clamping tubular elements so that even under field conditions such tubing elements can be circumferentially sheared at a precise, selected location without risking distortion or crushing of the tubing or creating irregularities thereon, by the use of an accompanying hand held shearing apparatus.

Another important object of this invention is to provide a shearing apparatus as well as a novel method for peripherally shearing thin-wall sleeve members or tubular elements wherein a mandrel, which rotatably fits the inside diameter of the tubular element, is provided with a projection on the mandrel axis which can be readily inserted into the corresponding hole of a mating mandrel in the complementary holding device for the tubular elements, to keep the two devices axially aligned during the shearing operation.

It is yet another object of this invention to provide a mandrel for supporting the inner surface of a tubular workpiece, which has a stop mounted thereon which can be fixed at any selected point along the mandrel, thus enabling the user to cut one or a series of tubular workpieces to a consistent and precise length.

Yet another object of my invention is to provide a shearing device or apparatus which incorporates a rotating shearing disc which will cleanly shear thin-wall tubular elements peripherally and in a plane common to one surface of the disc, which device provides internal support to a thin-wall tubular element while it is being progressively sheared peripherally.

Still another object of this invention is to provide a shearing apparatus and novel method for peripherally shearing thin-wall tubular elements by engaging a cam operated shear-off disc with the tubular workpiece, so that progressive shearing of the periphery of the tubular workpiece can be accomplished during relative rotation, while the user is applying an appropriate amount of force to the disc.

It is another object of this invention to provide a clamping device effectively utilizing a hand operated tightening arrangement which securely clamps a tubular workpiece externally and compresses it against an element that is internal to the workpiece, so that the workpiece is desirably and effectively prevented from rotating or moving longitudinally during a subsequent shearing operation.

It is still another object of this invention to provide a hand held clamping device for a tubular workpiece, having external serrations to permit firmly gripping the device by hand, and utilizing an internal mandrel for effectively supporting the inner surface of the tubular workpiece.

Another object of this invention is to provide a support pin for a thin-wall sleeve member, having at its working end a central hole for receiving an orienting and centralizing mandrel having a mating protrusion, thus ensuring that proper shearing action takes place between the support pin of the holding device, and the shearing apparatus.

Another object of this invention is to provide a mandrel holder for the clamping device, which mandrel holder is held in position during shear-off operations by a ball detent device which will ensure that the mandrel remains in the correct position with respect to the face of the tube clamping collet elements while the free end of the tubular workpiece is being sheared off.

Another object of this invention is the use of a ring element which is mated with the workpiece clamping collet by threads, which threads enable the ring element to be rotated and advanced longitudinally with respect to the collet, to close the collet segments upon the workpiece by virtue of a mating ramp angle existing in both the ring and the collet.

Another object of my invention is to provide a low cost, hand held device for rotatably shearing-off lengths from precision thin-wall tubular elements, to provide shorter tubular elements of a consistent length.

Another object of my invention is to provide a low cost, hand held shearing apparatus whose design permits a range of diameters of thin-wall tubular elements to be sheared-off peripherally and perpendicular to the axis of the tubular elements.

It is another object of my invention to provide a shear-off device which shears the periphery of thin-walled tubular elements from the outside, so as to provide a burr-free interior diameter to the sheared-off tubes.

It is another object of my invention to provide a shearing apparatus whose basic design is adaptable to incorporate into automatic equipment to shear-off tubular elements in a production set-up.

Another object of this invention is to provide a hand held device usable to adjust thin-wall tubular elements to length without resulting in the formation of chips, slivers or other machining debris which can cling to the tubular elements or get into associated work.

Yet another object of my invention is to provide a shearing apparatus which will permit the shear-off of lengths from thin-wall tubular elements as small as 1/16' in length, and which can be easily dis-assembled and re-assembled to replace worn or damaged shear-off discs.

Another object is to provide a shear-off device for peripherally shearing thin-wall tubular elements wherein a detent retained holder maintains the proper axial position of a tubular element supporting mandrel while the shear-off operation is in progress.

Another object of my invention is to provide a shear-off device for peripherally shearing thin-wall tubular elements in a plane perpendicular to their axis wherein the main body containing the movable and support elements may be fitted with one of several different plates whose faces define the shearing plane of the tool.

Another object is to provide a shear-off apparatus for peripherally shearing thin-wall tubular elements wherein the housing body of the apparatus incorporates a clearance hole to permit easy removal of shear-off portions of the tubular elements so that those sheared-off portions can be easily removed and discarded.

Still another object is to provide a hand held, hand operated shearing apparatus for peripheral shear-off of thin-wall tubular elements wherein the mandrel for supporting the thin-wall tubular element can be adjusted longitudinally with respect to the tubular element to provide optimum support of the tubular element during the shearing operation.

These and other objects, features and advantages of this invention will be more apparent as the description proceeds.

BRIEF DESCRIPTION OF DRAWINGS

FIG. 2 is a cross-sectional view of my shearing apparatus, revealing the mandrel mounted in a cantilever manner on the longitudinal centerline of the device, for supporting the thin-wall tube or sleeve to be cut to length by the adjacent cutoff or sharing means;

FIG. 3 is an end view of the cutoff device, revealing the circular cutting disc;

FIG. 4 is a view to a substantially larger scale, in which the offset support for the cutting disc is indicated;

FIG. 5 is a view of the removable mandrel, revealing certain aspects of its design;

FIG. 6 is a cross-sectional view of the shearing apparatus and the sleeve holding and supporting device placed in the fully operative relationship, with this view revealing many of the significant details of these devices;

FIG. 7 is end view of the sleeve gripping collet elements of the sleeve holding device;

FIG. 8 is a fragmentary showing of the slidable stop member that can be locked on the support pin at a carefully established location, so that thin-wall sleeve members can be turned out to a consistent length;

FIG. 9 is a perspective view revealing the way the user tightens the holding device on the sleeve so that the sleeve cannot move while the shearing apparatus progressively shears off the unwanted portion of the sleeve; and FIG. 10 is a perspective view showing how the novel method in accordance with this invention is typically pursued, involving the user grasping the holding device in his left hand, while holding the shearing apparatus in his right hand, with the two components being counter-rotated with respect to one another while pressing the two tightly together.

DETAILED DESCRIPTION

Figure 1:
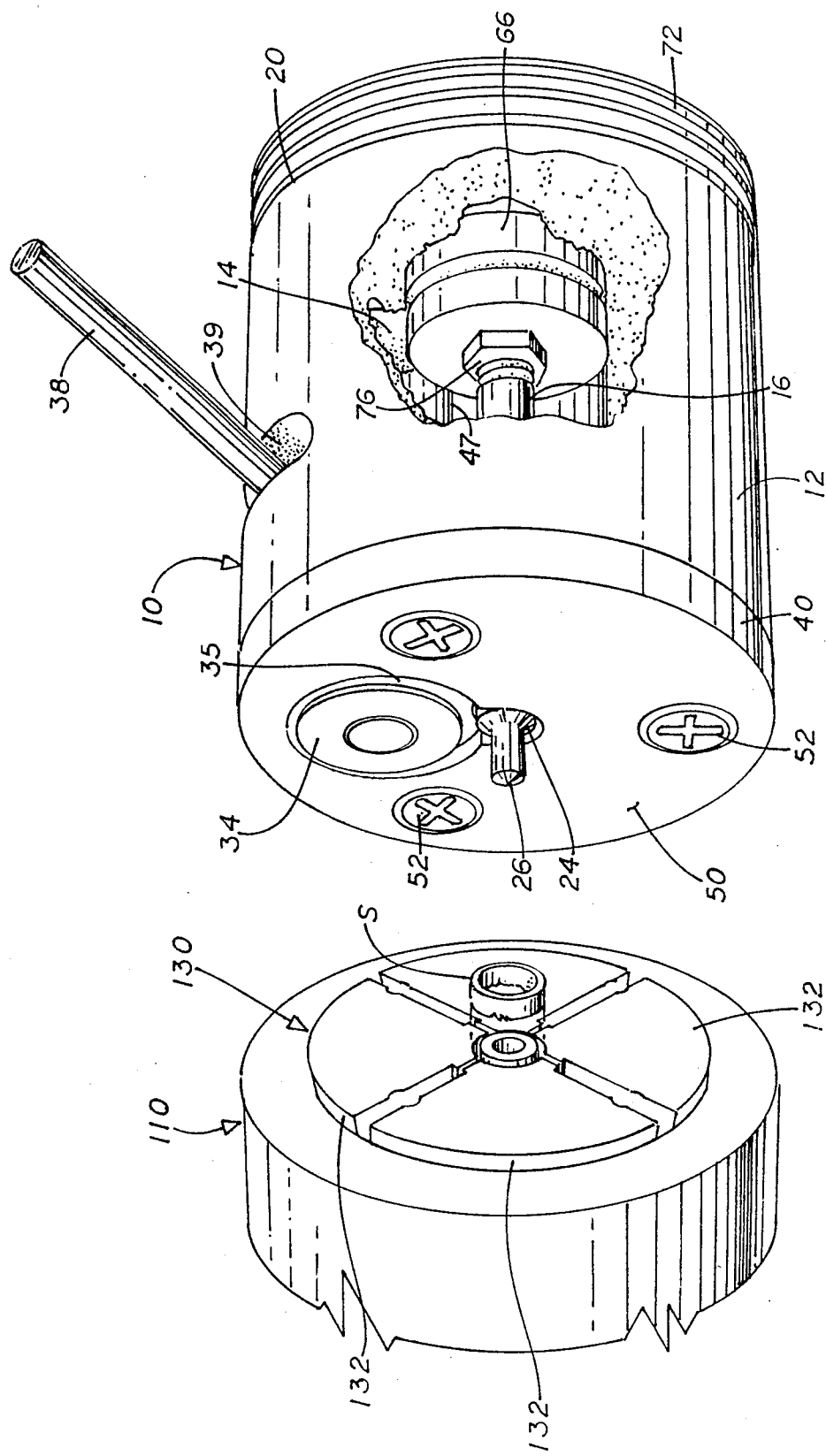
FIG. 1 is a perspective view showing my novel hand operable shearing apparatus disposed alongside my novel sleeve holding device, with these devices here having been moved somewhat away from the operative position.

Initially with reference to the hand held apparatus I utilize for shearing thin-wall sleeve members to a precise, selected length, it will see in FIG. 1 that hand operable apparatus 10 will accomplish a highly satisfactory cutoff operation without permitting the sidewall of the thin-wall tubing to collapse. The device or apparatus 10 involves an elongate, generally cylindrical body or housing member 12 having a partially hollow interior 14, the interior being revealed by the sidewall of the housing member being partially broken away for clarity reasons in FIG. 1. It will be noted from FIG. 2 that an elongate support mandrel 16 is mounted in a cantilever manner on the longitudinal centerline 18 of the cylindrical body 12, which mandrel is of a diameter to receive thereon, a section of thin-walled sleeve or tubing to be cut to length.

One end of the support mandrel 16 is supported adjacent the end 20 of the generally cylindrical body 12, whereas the other end of the support mandrel, the free end 24, protrudes through the central aperture 48 of the disc shaped end member 40 without contact therewith. The aperture 48 is best seen in FIGS. 2 and 3. The member 40 is suitably secured to the housing member 12 by the use of a plurality of bolts or machine screws 52, for example, and it has a flat end face 50. The central aperture 48 is large enough to permit the entry of a piece or section of thin-walled tubing or sleeve whose length is to be carefully modified, where it will be received on the mandrel 16.

As will be understood when the cutoff operation is described hereinafter, a sleeve member S to be cut to a desired length is held between collet jaws of sleeve holder device 110, depicted on the left side of FIG. 1. It is to be noted that a sleeve member whose length is to be modified in a precise manner in accordance with this invention does not fit upon the mandrel 16 so tightly but what it can still be rotatable to some degree or extent thereon. The free end 24 of the mandrel 16 is necked-down to form a protrusion or centering point 26 visible in FIGS. 1 and 2, usable for alignment purposes described hereinafter.

As will later be explained at some length, the sleeve holder device 110 utilizes collet jaws or elements that can be selectively controlled to grasp carefully and firmly the thin-wall tubing or sleeve that is to be cut to length by the utilization of the hand operable shearing apparatus 10. The user is to use his two hands in holding the devices 10 and 110 closely together in aligned and abutting relation, as shown in FIGS. 6, 9 and 10, at such time as sleeve cutoff to a precise length is to be effected, while the extending sleeve portion is being carefully supported upon the mandrel 16 of the cutoff device.

Returning to a consideration of the shearing apparatus of FIGS. 1 and 2, a cutoff means or disc 34 is operatively mounted in a recess 35 and supported by a pin 36 on the end of the rotatable, cylindrically shaped component 44. The disc 34 has a sharpened peripheral edge, and is mounted so as to permit free rotation on its mounting pin 36, as well as controlled lateral movement in the recess 35 of the component 40, due to rotation of component 44. The recess 35 may be regarded as being in an upper part of the circular end member 40, in the general vicinity of the handle or lever 38. The lever 38 is movable in a slot 39, and the lever is to be manipulated by the user to cause selective inward lateral movement of the rotatably mounted disc 34 during the utilization of my device, to accomplish a cutting (shearing) of the extending portions of a thin-walled sleeve member to a desired length.

With particular reference to FIG. 2, it will be seen that disc 34 is mounted upon the cylindrically shaped part or component 44 that is rotatably mounted in one quadrant of the housing member 12. The lever 38 is rigidly attached to the cylindrical member 44, such as by the end of the lever being inserted into a hole 46 drilled radially into the member 44. The lever 38 enables the user of my device to control the rotation of the member 44 about its axis of rotation 45. The disc 34 is mounted on the cylindrical member 44 by means of a pin 36 as previously mentioned, the axis of which pin is deliberately offset from the central axis 45 of the cylindrical member 44; note FIG. 4. This arrangement makes possible a camming or eccentric type action whereby disc 34 is moved inward, toward mandrel 16 and into contact with the properly supported thin-walled sleeve to be severed, when the user moves the lever 38 to force the cylindrical member 44 to rotate. This will be later discussed in more detail.

The cutoff means 34 of the shearing apparatus is thus mounted for a limited amount of inward movement in a generally radial direction, described to a further extent hereinafter, and the plane of the cutoff disc 34 is to be noted to be disposed approximately in the plane of the face 50 located on the exterior face of the disc shaped component 40; note FIG. 2. The component 40 was earlier explained to be bolted or otherwise attached to the end of cylindrically shaped body member 12, remote from the end 20 of the member 12.

The face 50 defines a specific location that plays a part in the precise functioning of my shearing apparatus, when it is brought into aligned relation with the sleeve holding device, as will be described at some length hereinafter.

The manually operable lever 38 is selectively movable by the user through the aforementioned elongate slot 39 in the housing of the shearing apparatus, which slot is sufficiently long as to permit rotation of the lever over a substantial number of degrees about the axis of rotation 45 of the rotatable cylindrical member 44. The lever 38 controls the essentially radial motion of the disc 34 with respect to the sleeve to be cut off, and this lever is placed so as to be easily movable by the user between a non-operative position, depicted in full lines in FIG. 3, and an operative position shown in dashed lines in this figure. In the operative position, the cutoff disc 34 is in a position in which the sharpened edge of the disc is effective to cut the protruding end of the sleeve S to a desired length.

I prefer to utilize a cap screw 42 in the slot 39, serving as an adjustable stop to prevent the lever 38 being pushed too far through the slot 39; note FIG. 3. In this way the cutting edge of the disc 34 is not forced too far or too rapidly into the sleeve being sheared. As a matter of fact, I prefer the construction to be such that the disc only goes through the material being cut, and does not have anything more than a very light contact with the pin 116. The most desirable positioning of the stop 42 with respect to the lever is of course accomplished by rotating the threaded cap screw in the appropriate direction.

By now it will be understood that the cutoff means 34 is designed to incrementally cut the sleeve member S as a result of relative rotative motion between the sharpened peripheral edge of the disc 34, and the protruding sleeve member. The main portion of the sleeve member is of course held tightly in the holder type device 110, as described briefly hereinbefore, with the protruding end of the sleeve supported internally by the mandrel 16.

FIG. 4 reveals that the axis of rotation 37 of the cutoff or shearing means 34, about which it rotates during a sleeve cutting operation, is deliberately offset from the axis of rotation 45 of the cylindrical member 44 by an extent indicated as in FIG. 4. This offset assures a sufficient eccentric type movement of the cutoff disc 34 as will accomplish the cutoff of the sleeve S at the desired location. The excursion of the disc 34 results of course from a movement of the lever 38 within the slot 39.

With further reference to FIG. 2, it will be noted that the mandrel 16 is not firmly affixed to the body member 12, but rather the mandrel is supported from an insert member 66 that is substantially larger in diameter than the diameter of the support mandrel 16. The inner end of the mandrel 16 is equipped with threads, and these threads engage threads located in a tapped hole located on the centerline of the member 66. The extent of the mandrel that is caused to protrude through the central aperture 48 is controlled by rotating the mandrel 16 on its axis. After the appropriate setting of mandrel length has been accomplished, it is secured in the proper position by means of locknut 76.

As will be noted from FIG. 2, the insert member 66 is received in a hole 68 of suitable size that is defined in the end 20 of the body member 12. An encircling groove 69 around the member 66 may be engaged by a spring biased detent member, not shown, that serves to hold the non-rotative member 66 in the operative position illustrated in FIGS. 1 and 2. The spring detent may be replaced by a short screw if desired, that may be loosened to permit withdrawal of the insert member and mandrel, and then retightened when the member 66 and the mandrel are back in the operative position in the body member 12.

Closure member 72 utilized at the end 20 of the body member 12 is a disc shaped member whose outer diameter is approximately the same diameter as the body member 12, and its exterior may, for example, be knurled, so that it may be readily grasped by the user. On the centerline of the closure member 72 is an aperture in which the threaded end of the mandrel 16 may on occasion be received; note FIG. 5. The insert member 66 is integral with the closure member 72 in a centered, symmetrical manner.

Because of the above-described construction, the user can readily withdraw the mandrel 16 from the body member 12 merely by grasping the member 72 and pulling it away from the body 12. The mandrel is typically withdrawn from the body member after every use, for it is necessary to remove the unwanted cut-off end of the sleeve from the mandrel, so that the user can effectively proceed with the next cut-off operation.

It should be noted that unless a definite withdrawal effort is put forth, the mandrel 16 will continue to reside in the centered position in the body 12. This is because of the detent relationship that is created, and the limit ed amount of clearance that exists between the outer surface of the member 66, and the aperture 68 in the end of the member 12.

SLEEVE HOLDER DEVICE

With reference now to FIG. 6, it will be seen that I have shown the cutoff apparatus 10 placed in operative relationship to the sleeve holding device 110, which involves the user grasping the two members in the general manner shown in FIG. 10.

As clearly revealed in FIGS. 6 and 9, the sleeve holding device 110 is hand-held, and has an elongate, generally cylindrical body 112, whose interior 114 is partially hollow.

Cylindrically disposed on the centerline of the cylindrical body or housing 112 is an elongate support pin or mandrel 116 mounted in a cantilever manner on the longitudinal centerline 118 of the cylindrical body 112.

One end of the elongate support pin 116 is supported adjacent the far end of the device 110, whereas the other end of the support mandrel, the free end 124, is of a diameter such that a thin-wall sleeve member or tube to be cut to length can be received thereon.

It is desired to hold one portion of the sleeve member tightly on the free end of the support mandrel 116, and to that end I provide a grasping means 130, as shown in FIG. 7, whose construction is such that the user of my device can cause the sleeve S to be clamped between collet segments or elements 132 and mandrel or pin 116 so it will neither slide along the length of the pin 116, nor rotate thereon.

The grasping means 130 functions by rotating on screw threads 144 so as to force inwardly the collet elements 132. Each of these collet elements or segments has a sleeve-member-contacting inner portion carefully configured to properly contact the outer surface of the sleeve member. The exterior of the collet elements 132 define a tapered circular exterior surface 134. The relationship of these collet elements 132 is best seen in FIGS. 6 and 7.

The collet segments 132 also have a flattened outermost surface, disposed vertically as revealed in FIGS. 6 and 7, so as to collectively define a face 150. As is apparent from FIG. 6, the face 150 of the sleeve holder device, and the face 50 of the shearing apparatus, are in close contact when the two separate devices or components are brought together in the operative relationship depicted in FIG. 6.

The collet elements 132 each possess inherent springiness, and the ends of the collet elements remote from the face 150 are part of an entire collet 142, best seen in FIG. 6, having encircling screw threads 144 disposed approximately in the mid portion of the collet 142. The interior of the generally cylindrical body member 112 is threaded adjacent the end 120, with it being understood from viewing FIG. 6 that upon relative rotation taking place between the member 112 and the collet 142, the longitudinal relationship of the collet elements 132 to the body member 112 will change.

It is to be understood that the collet elements 132 may be collectively regarded as defining the previously mentioned tapered circular exterior surface 134. This circular exterior surface 134 is tapered toward the centerline at the left end of the collet member 142, as will be noted from FIG. 6, whereas the interior of member 112 adjacent the exterior surface 134 forms a similar, but interiorly tapered surface 136.

It should be apparent from inspection of FIG. 6 that the two tapered surfaces are disposed at approximately the same angle with respect to the common centerline of the member 112 and collet 142. Thus, when the generally circular member 112 is rotated with respect to the collet 142, in the manner indicated in FIG. 9, this causes exteriorally tapered surface 134 to change its longitudinal position with respect to the interiorly tapered surface 136. Thus, rotating the member 112 in one direction with respect to the collet 142 causes the collet elements 132 to move inwardly from member 112, and bring about a gripping action such that the sleeve S will be grasped very tightly against the free end of the elongate support pin or mandrel 116. Upon rotating the member 112 in the opposite direction with respect to collet 142, however, the collet elements 132 will spring outwardly to remain in contact with member 112, and thus release the sleeve S.

As also visible in FIG. 6, the collet body 142 extends rearwardly of the threads 144 for a substantial distance, with an encircling member 146 being mounted at what may be regarded as the rear end of collet 142. A radially disposed, tapped hole exists in the member 146, in which is disposed a lock screw 148. As is obvious, the lock screw, when tightened, serves to keep the member 146 from moving away from the desired position.

A circular closure member 172 forms the outer end of the sleeve holder device, and the member 172 is integral with a circular insert member 166 that is closely fitted in the end of collet 142. A groove 169 encircles the member 166, and a detent member (not shown), is utilized in the interior of collet 142, serving to keep the member 166 in the position revealed in FIG. 6.

The circular element 166 is drilled and tapped along its centerline, into the threads of which the threaded end 117 of the pin 116 is received. A locknut 176 is disposed on the threads 117 of the pin 116, which locknut may be carefully tightened against the near surface of the member 166 once the elongate pin 116 has been placed in a desired relationship to the faces of the collet elements 132 of the collet member 142.

FIG. 6 reveals that sleeve member S is received on the free end of mandrel or pin 116, with the free end of the sleeve member being designed to enter the central aperture 48 of the disc shaped member 40 when cutoff of the sleeve is to be brought about. The other end of the sleeve member S is normally flared or upset to form a type of head member of increased diameter, as will be noted in FIG. 6.

So that a desired extent of each sleeve member S inserted onto the pin 116 can be caused to extend outwardly for a consistent distance from the face 150 created on the outer end of the collet elements 132, i utilize a stop member or motion limiting means 180 on the pin 116. The position the stop 180 occupies on the pin 116 can be established by threading it along in the desired direction on the pin. When this desired position has been established, a lock screw 182 on the stop 180 is tightened so that it bears tightly against the outer surface of the pin 116, thereby preventing the stop from changing its location with respect to the pin. It is against the near end of this stop member 180 that the flared or headed end of the sleeve S is brought to rest, before the collet elements 132 are caused to tighten around the sleeve member as a result of the rotation of the member 112 relative to the collet 142. Because of this highly effective arrangement I can produce sleeve members of a consistent and highly accurate length.

As previously mentioned, the free end 24 of the mandrel 16 of the cutoff device 10 is necked-down to form a protrusion or alignment member 26 of lesser diameter, and I prefer to create a hole 126 in the free end of the pin 116 that will receive the protrusion 26. The hole 126 in the pin 116, visible in FIGS. 6 and 8, is of a diameter only slightly larger than the diameter of the protrusion 26, so that a close fit will be achieved.

As a result of this construction, upon the protrusion 26 being caused to enter the hole 126 in the end of pin 116, the face 50 of the shearing apparatus or device can be brought into close, intimate contact with the face 150 of the sleeve holder member, in the manner depicted in FIGS. 6 and 10. At this point, the mandrels are in precise alignment, and the accurate and non-damaging cutoff of the thin-walled sleeve member S to the desired extent can then proceed.

That such may be accomplished, the user utilizes his two hands, typically in the manner depicted in FIG. 10, and while holding the device 10 stationary in his right hand, for example, he proceeds to rotate the device 110 with his left hand, while at the same time keeping the two devices tightly in contact. Obviously I am not to be limited to any particular way of achieving relative rotation, for the sleeve could be cut off to the precisely desired length while holding the device 110 stationary, and rotating the apparatus 10.

Of consequence is that the user is to move the lever 38 away from the non-active position, toward the position in which the cutting disc 34 is caused to make contact with the outer surface of the thin-wall sleeve. As shown in FIG. 10, this movement of the lever would typically be brought about by use of the right thumb, with the lever being moved rearwardly rather than forwardly. The user should keep a relatively constant amount of pressure on the lever while he brings about the relative rotation of one of the members with respect to the other. By keeping a relatively constant, firm pressure on the lever, he can cause the cutoff disc 34 to keep circling around the thin metal sleeve until such time as it has been sheared entirely through.

Quite significantly, the thin-walled sleeve has been internally supported during the entire procedure, meaning that there is little if any opportunity for the sidewall of the portion of the sleeve that is to be utilized being bent or distorted in any way. Also, because the mandrel 16 of the member or apparatus 10 forms a firm support for the cutting operation, the user is assured of the edges of the cut being smooth, such that the portion of the sleeve grasped by the collet elements normally can be immediately utilized, without any deburring operation being necessary.

With only a relatively small amount of practice, the typical user can develop a considerable amount of skill in the cutoff of thin-walled sleeves to a desired length in a minimum of time.

As is obvious, my invention is not limited to any one diameter of thin-walled sleeve. Different basic sleeve diameters require that certain tool elements be changed, while using the same basic design, with most elements being common to all sizes of tools.

It is to be realized that I have provided a holding device for break-off or shear-off of thin-wall tubular workpieces in accordance with a basic, novel design, which is adaptable to a wide range of workpiece diameters by changing only two dimensions of the collet element. These dimensions are the workpiece-receiving hole in the collet segments, and the wall thickness of the collet segments.

It should now be clear that I have provided a hand held device for securely clamping thin wall tubular elements so that even under field conditions, such tubular elements can be circumferentially sheared at a precise, selected location without risking distortion or crushing of the tubing, or the creation of any irregularities thereon. This shearing operation is accomplished by the use of an accompanying hand held shearing apparatus.

The novel shearing apparatus utilizes a mandrel, which rotatably fits the inside diameter of the tubular element or workpiece, and which is provided with a projection on the mandrel axis which can be readily inserted into a corresponding hole in the mating mandrel utilized in the complementary holding device, thus keeping the two devices axially aligned during the shearing operation. The user can apply a desirable amount of force to the shearing member utilized in the shearing apparatus, while bringing about a relative rotation between the shearing apparatus, and the tubular element held in the holding device.

A stop member can advantageously be fixed at any selected point along the mandrel utilized in the holding device, thus enabling the user to cut one or a series of tubular workpieces to a consistent and precise length.

I claim:

1. Hand operable apparatus for shearing thin-wall sleeve members to a precise, selected length without causing sidewall collapse, said apparatus comprising,
   an elongate, generally cylindrical body having a partially hollow interior,
   an elongate support mandrel mounted in a cantilever manner on the longitudinal centerline within said cylindrical body, one end of said support mandrel being supported adjacent one end of said generally cylindrical body, the other end of said support mandrel being free and of a diameter such that the end of a thin-walled sleeve member to be cut to length can be closely received thereon, cutoff means operatively mounted by support means on said generally cylindrical body adjacent the free end of said support mandrel, said cutoff means being manipulated by means of a finger operated lever, said cutoff means being operable toward said support means to bring cutoff means into contact with the sleeve member at a selected location.

2. The hand operable apparatus for shearing thin-wall sleeve members to a precise length as recited in claim 1 in which said cutoff means incrementally shears the sleeve member as a result of relative rotative motion between said cutoff means and the sleeve member.

3. The hand operable apparatus for shearing thin-wall sleeve members to a precise length as recited in claim 2 in which said cutoff means is circular and rotatably supported so as to roll around the exterior of the sleeve member to progressively shear same.

4. Hand operable shearing apparatus for shearing thin-wall sleeve members to a precise length without causing sidewall collapse, comprising, an elongate cylindrical body having a partially hollow interior and a flat, circular face plate at one end, said circular face plate having an outwardly disposed contact surface, and having a centrally disposed hole located on the longitudinal centerline of said cylindrical body, into which hole a thin-wall sleeve member to be cut to length can be inserted, an elongate support mandrel mounted in a cantilevered manner on the longitudinal centerline of said cylindrical body, and extending into said centrally disposed hole, and for a short distance beyond, said support mandrel being of circular cross section and of a diameter such that the end of a thin-walled sleeve member to be cut to length can be received thereon, a shearing member having a sharpened edge, operatively mounted in the plane of said face plate and movable between operational and non-operational positions, said shearing member being movable on occasion toward the sleeve member, to selectively and incrementally force said sharpened edge through the sidewall of the sleeve member and shear the sleeve member along the plane of said face plate.

5. The hand operable shearing apparatus as recited in claim 4 wherein said shearing member progressively shears the sleeve member as a result of relative rotative motion occurring between said shearing member and the sleeve member, and the application of force to said shearing member.

6. The hand operable shearing apparatus as recited in claim 5 in which means are provided to enable the user to apply a selected amount of force to said shearing member.

7. The hand operable shearing apparatus as recited in claim 5 wherein said shearing member is circular and rotatably supported on a selectively movable support assembly so that said shearing member rolls around the exterior of the sleeve member to shear same.

8. The hand operable shearing apparatus as recited in claim 7 in which means are provided to enable the user to apply a selected amount of force to said shearing member during the time it is in contact with the sleeve member.

9. The hand operable shearing apparatus as recited in claim 4 wherein said elongate support mandrel is constructed so as to be readily removable from said elongate cylindrical body.

10. The hand operable shearing apparatus as recited in claim 4 in which interconnect means is utilized for maintaining a precise coaxial alignment between the sleeve member and said shearing member, at the time the shearing operation is underway.

11. The hand operable shearing apparatus as recited in claim 4 with which is utilized, in combination, a separate hand held sleeve holding device of generally cylindrical configuration, said device having a partially hollow interior, a support pin supported in a cantilever manner symmetrically along the centerline of the interior of said hand held device, said support pin having a free end and being adapted to receive a thin-wall sleeve member thereon, a plurality of radially movable collet elements mounted on said device adjacent said free end of said support pin, with the radially inner portion of each of said collet elements being arranged to move radially inward so as to be able to forcefully contact, on occasion, the exterior of a sleeve member whose length is to be reduced, that has been slid onto said support pin, said collet elements, upon being brought into forceful contact with the sleeve member, serving to non-rotatably hold the sleeve member, and means on said free end of said support pin enabling the user to bring the sleeve member clamped by said collet elements into carefully aligned contact with said mandrel and said shearing member of said hand operable shearing apparatus, thus to simplify the rapid and accurate reduction of the length of the sleeve member.

12. The sleeve holding device as recited in claim 11 in which a slidable member is mounted on said support pin, said slidable member, when locked in a selected position, functioning to assure each successively inserted thin-wall sleeve member being held so as to protrude beyond said support pin for an amount such that each such thin-wall sleeve member can be sheared to a consistent length.

13. The hand operable shearing apparatus as recited in claim 11, wherein said support pin is readily removable from said device, so that the sleeve member that has been cut to length can be readily removed.

14. Hand operable shearing apparatus for shearing thin-wall sleeve members to a precise length without causing sidewall collapse, comprising, an elongate cylindrical body having a partially hollow interior and a flat, circular face plate at one end, said circular face plate having an outwardly disposed contact surface, and having a centrally disposed hole located on the longitudinal centerline of said cylindrical body, into which hole, the end of a thin-wall sleeve member to be cut to length can be inserted, an elongate support mandrel mounted in a cantilever manner on the longitudinal centerline of said cylindrical body, with its free end extending into said centrally disposed hole, and for a short distance beyond, said support mandrel being of circular cross section and of a diameter such that a portion of the thin-walled sleeve member to be cut to length can be received thereon, said circular face plate having a generally flat, elongate recess defined in its contact surface, a circular cutoff disc smaller than said recess and having a central mounting hole, said cutoff disc having a sharpened peripheral edge located approximately in the plane of the contact surface of said circular face plate, support means for operatively mounting said cutoff disc from its central mounting hole in said flat recess, said support means permitting said cutoff disc to be moved from one position to another in said recess, motion producing means operatively associated with said support means, for enabling a user to bring about lateral movement of said cutoff disc in said flat recess with respect to the longitudinal centerline of said cylindrical body, between active and inactive positions, said cutoff disc being adapted, when moved by said motion producing means toward its active position, to come into forceful contact with the sidewall of the inserted thin-wall sleeve member, to cause the severing thereof as a consequence of relative rotative motion taking place between the sharpened peripheral edge of said cutoff disc and the sleeve member.

15. The hand operable shearing apparatus as recited in claim 14 in which said cutoff disc progressively shears the sleeve member during the relative rotative motion occurring between said cutoff disc and the sleeve member.

16. The hand operable shearing apparatus as recited in claim 14 in which a lever is provided to enable the user to apply a selected amount of force to said motion producing means during the shearing of the sleeve member.

17. The hand operable shearing apparatus as recited in claim 14 in which said elongate support mandrel is constructed so as to be readily removable from said elongate cylindrical body.

18. The hand operable shearing apparatus as recited in claim 14 with which is utilized, in combination, a separate hand held sleeve holding device of generally cylindrical configuration, serving to support the thin-wall sleeve in a non-rotatable manner therein, said hand held sleeve holding device having means thereon able to be brought into careful alignment with the free end of said support mandrel, thus to enable the user to cause relative rotation between said hand operable apparatus and said sleeve holding device in order to precisely shear the sleeve to a desired length by the operation of said cutoff disc.

19. A sleeve holding device !or mounting a thin-wall sleeve member so that the sleeve member can be cut to a precise length without causing sidewall collapse, comprising, an elongate cylindrical body having a partially hollow interior and a flat contact surface at one end, said flat contact surface being made up of a plurality of similarly sized collet segments symmetrically disposed about the longitudinal centerline of said cylindrical body, said collet segments being mounted and configured so as to normally tend to move apart, with each of said collet segments having a sleeve-member-contacting inner portion, an elongate support pin mounted in a cantilever manner on the longitudinal centerline of said cylindrical body, with the free end thereof extending into a location adjacent said sleeve-member-contacting portions of said collet segments, said support pin being of circular cross section and of a diameter such that a substantial portion of a thin-wall sleeve member to be cut to length can be received precisely thereon, with the remainder of the sleeve member protruding beyond said support pin, means for causing said collet segments to move inwardly together in a like and consistent manner at the behest of the user, so that the thin-wall sleeve member to be cut to length can be in contact with the sleeve-member-contacting portions of said collet segments, and held securely, said support pin having means in the end thereof, to enable firm contact with a hand held shearing apparatus, thus to make possible a careful alignment between the longitudinal centerline of said sleeve holding device and the longitudinal centerline of said shearing apparatus, whereby the protruding end of the thin-walled sleeve member can be severed by the use of said shearing apparatus at the time of relative rotative motion taking place between said shearing apparatus and the thin-wall sleeve member.

20. The sleeve holding device as recited in claim 19 wherein said means for causing said collet segments to move inwardly together is an encircling, threaded tightening member.

21. The sleeve holding device as recited in claim 19 in which a slidable member is mounted on said support pin, said slidable member, when locked in a selected position, functioning to assure each successively inserted thin-wall sleeve member being held so as to protrude beyond said support pin for an amount such that each such thin-wall sleeve member can be sheared to a consistent length.

22. The sleeve holding device as recited in claim 19 in which a hand operable apparatus for shearing thin-wall sleeve members to a precise, selected length is used in combination therewith, said apparatus comprising, an elongate, generally cylindrical body having a partially hollow interior, an elongate support mandrel mounted in a cantilever manner on the longitudinal centerline within said cylindrical body, one end of said support mandrel being supported adjacent one end of said generally cylindrical body, the other end of said support mandrel being free and of a diameter such that the end of the thin-wall sleeve member held by said sleeve holding device to be cut to length can be closely received thereon when said sleeve holding device and said apparatus for shearing have been brought together in aligned relationship, cutoff means operatively mounted by support means on said generally cylindrical body adjacent the free end of said support mandrel, said support means being operable to bring said cutoff means forcefully into contact with the sleeve member at a selected location, to accomplish the shearing thereof.

23. Hand operable apparatus for shearing a thin-wall sleeve member to a precise, selected length without causing sidewall collapse, utilized in conjunction with a separate hand held sleeve holding device of generally cylindrical configuration, said apparatus comprising, an elongate, generally cylindrical body having a partially hollow interior, an elongate support mandrel mounted in a cantilever manner on the longitudinal centerline within said cylindrical body, one end of said support mandrel being supported adjacent one end of said generally cylindrical body, the other end of said support mandrel being free and of a diameter such that a thin-wall sleeve member to be cut to length can be closely received thereon, cutoff means operatively mounted by support means on said generally cylindrical body adjacent the free end of said support mandrel, said support means being operable to bring said cutoff means forcefully into contact with the sleeve member at a selected location, said sleeve holding device having a partially hollow interior and having a support pin for supporting in a fixed relationship therein, the thin-wall sleeve member to be cut to length, said support pin being supported in a cantilever manner symmetrically along the centerline of the interior of said hand held device, a plurality of radially movable collet elements mounted on said device adjacent said free end of said support pin, with the radially inner portion of each of said collet elements being arranged to move radially inward so as to forcefully contact, on occasion, the exterior of the thin-wall sleeve member, said collet elements, upon being caused to move radially inward, thus serving to tightly and non-rotatably hold said thin-wall sleeve member in contact with said centrally disposed pin, and means on said free end of said support pin enabling the user to bring the thin-wall sleeve member clamped by said collet elements into carefully aligned contact with the mandrel of said hand operable shearing apparatus, such that the user can proceed to shear the sleeve member at a selected location utilizing relative rotation between said hand operable apparatus and said sleeve holding device.

24. The sleeve holding device as recited in claim 23 in which a slidable member is mounted on said support pin, said slidable member, when locked in a selected position, functioning to assure each successively inserted thin-wall sleeve member being held so as to protrude beyond said support pin for an amount such that each such thin-wall sleeve member can be sheared to a consistent length.

25. The method of hand shearing a thin-wall sleeve member to a precise length without causing sidewall collapse, utilizing a pair of elongate cylindrical bodies of similar size, with each having a partially hollow interior and an elongate support mandrel mounted in a cantilever manner on its longitudinal centerline, a first of said cylindrical bodies having an operator-manipulated circular cutoff disc operatively mounted adjacent the end of its support mandrel, and the second of said cylindrical bodies having a plurality of collet members movable together or apart adjacent the end of its support mandrel, such that said collet members can hold a sleeve member tightly against undesired rotation, said method comprising the steps of mounting a sleeve member on the mandrel of said second cylindrical body, with a desired portion of the sleeve member extending outwardly from the body, tightening said collet members around the sleeve, to hold it against rotation, and/or longitudinal movement, moving said first and second cylindrical bodies into closely abutting positions, with the longitudinal centerlines of the cylindrical bodies in alignment, with the ends of the two mandrels in an interfitting, operative relationship, and with the outwardly extending portion of the sleeve member disposed in close proximity to said circular cutoff disc, forcing the cutting edge of said circular cutoff disc into contact with the outwardly extending sleeve portion extending from said second cylindrical body, and then while holding the two cylindrical bodies closely together, proceeding to cause relative rotation of one of said cylindrical bodies with respect to the other, while holding the ends of the mandrels in interfitting relationship, thus causing said cutoff disc to roll around a certain location on the outwardly extending sleeve portion in a peripheral cutting relationship, thereby shearing the fully supported sleeve member to a precise length, while avoiding sidewall collapse and the creation of burrs.

* * * * *